No. 840,370. PATENTED JAN. 1, 1907.
C. RACH.
COOKER FOR BREWING PURPOSES.
APPLICATION FILED OCT. 27, 1904.

2 SHEETS—SHEET 1.

WITNESSES
Mary H. Woodruff
Walter Abbe

INVENTOR
Carl Rach
BY
Howson and Howson
ATTORNEYS

No. 840,370. PATENTED JAN. 1, 1907.
C. RACH.
COOKER FOR BREWING PURPOSES.
APPLICATION FILED OCT. 27, 1904.

2 SHEETS—SHEET 2.

WITNESSES
M. H. Woodruff
Walter Abb

INVENTOR
Carl Rach
BY
Howson and Howson
ATTORNEYS

UNITED STATES PATENT OFFICE.

CARL RACH, OF NEW YORK, N. Y.

COOKER FOR BREWING PURPOSES.

No. 840,370.  Specification of Letters Patent.  Patented Jan. 1, 1907.

Application filed October 27, 1904. Serial No. 230,218.

*To all whom it may concern:*

Be it known that I, CARL RACH, a subject of the King of Prussia, residing in the borough of Manhattan, in the city, county, and State of New York, have invented an Improved Cooker for Brewing Purposes, of which the following is a specification.

My invention consists of an improved cooking apparatus or mashing vessel for use in brewing processes, the object of my invention being to so construct the apparatus as to facilitate the cooking and also the manipulation of the material and to do this with the most successful results, no matter what may be the particular brewing process which is being carried out.

Figure 1:
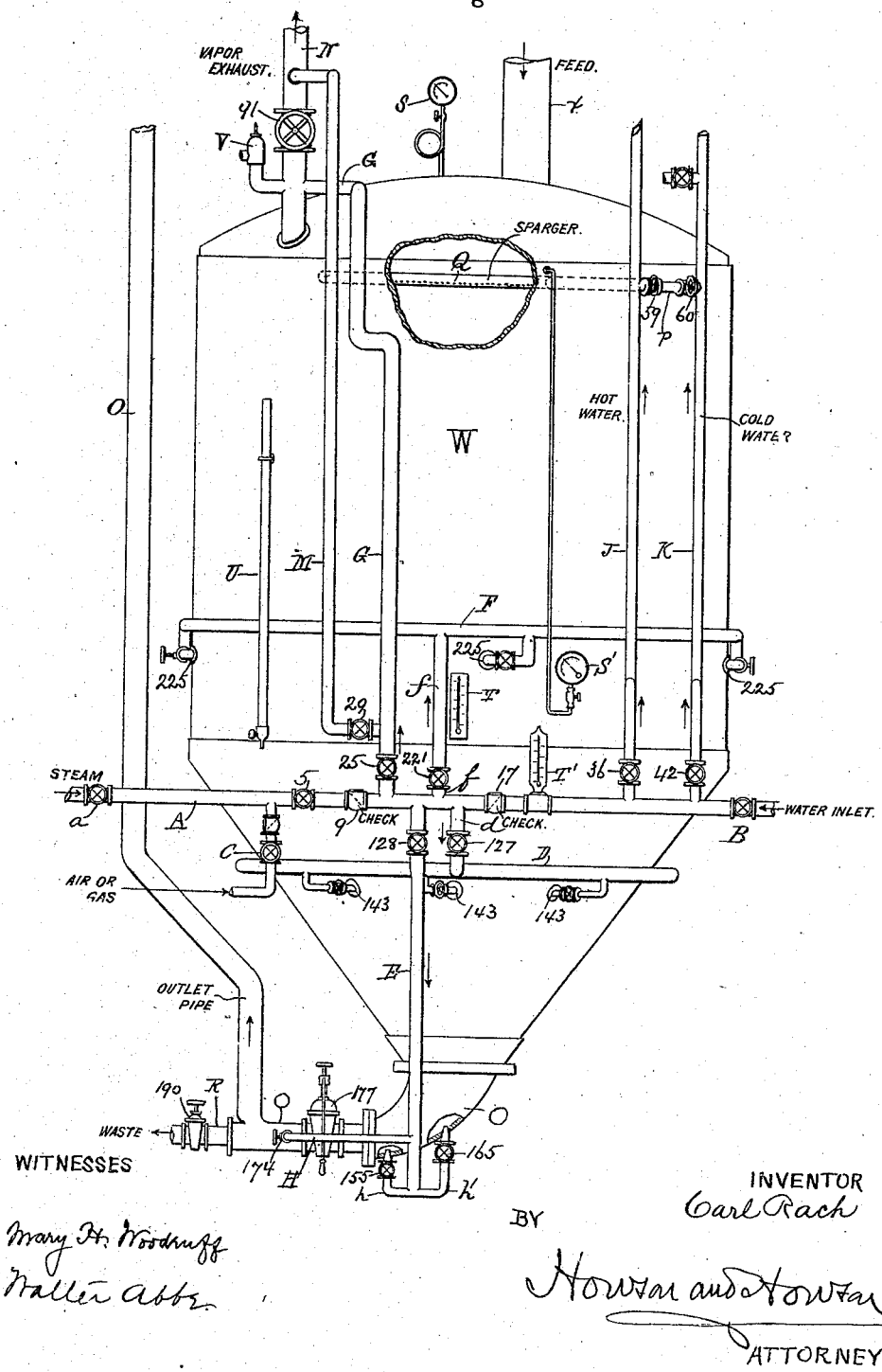
Figure 2:
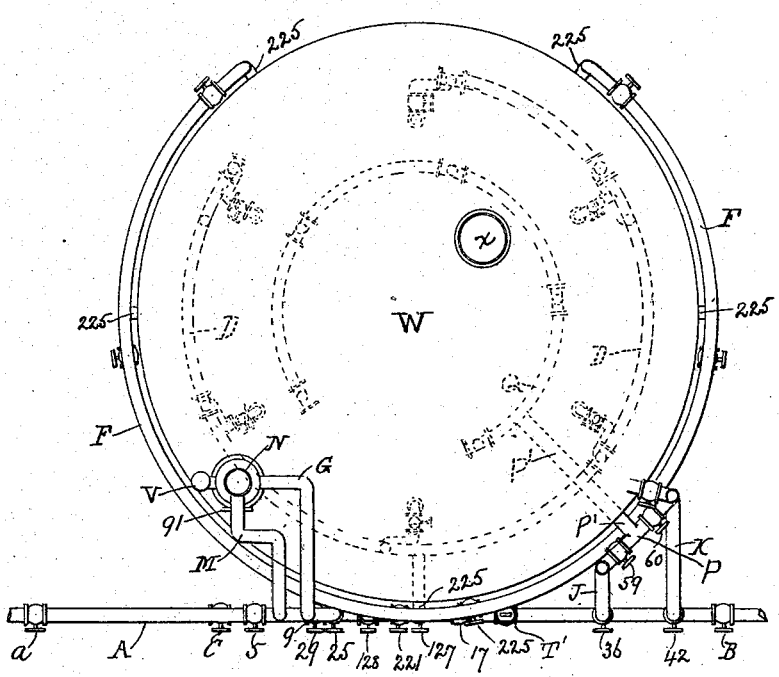

In the accompanying drawings, Figure 1 is a front elevation of my improved cooking apparatus, and Fig. 2 is a plan view of the same.

The vessel W may be of any suitable shape, but I prefer the upright cylindrical form shown with coned lower end, leading to the usual outlet-pipe O, through which the mash may be discharged into another vessel upon opening the valve 177 and applying steam, air, or gas pressure to the upper part of the vessel. An outlet R, with valve 190, may be employed to run off waste into the sewer. The vessel has a top feed-pipe $x$, through which the materials to be mashed are supplied in the first instance, and on the upper part of the vessel there are also provided a vapor outlet or exhaust N, with valve 91 and safety-valve V and a pressure-gage S, while S' is a second pressure-gage, T is a thermometer, and U is a water-gage.

My present invention has special reference to the system of piping which I will now describe.

In the first place I provide a main-line pipe A, which I prefer to arrange horizontally, as shown, provided at $a$ with a valved inlet for the admission of steam, at B with a valved inlet for the admission of water, (hot or cold,) and at C with a valved inlet for the admission of compressed air or gas, as may be desired. To the center of this main-line pipe A are connected two branches $d$ and $f$, the branch $d$, with valve 127, leading to a ring-pipe D, which has valved inlets 143 to the interior of the vessel W at its lower coned part, while the branch $f$, with valve 221, leads to an upper ring-pipe F, with valved inlets 225, to the interior of the vessel W at its cylindrical part.

There is a third branch E with a valve 128, leading from about the center of the main-line pipe A to the outlet end of the coned part of the vessel W. This pipe E has three branches, one a branch H, with valve 174, leading to the outlet beyond the valve 177, while the two other branches $h$ $h'$, with valves 155 and 165, respectively, provide upwardly-projecting jets into the bottom of the cone.

To the main pipe there is also connected near the center an upwardly-extending pipe G, which has a valve 25, and at its upper end connects directly or indirectly with the upper part of the vessel W, being shown in this instance as opening into the exhaust-pipe N below the valve 91. From this pipe G there is a branch exhaust-pipe M, with valve 29 opening into the pipe N above its valve 91.

On the water-inlet side of the main pipe-line A, I provide two upwardly-extending water-pipes J and K, the former with valve 36 for, say, hot water, while the pipe K, with valve 42, is for cold water. Near the upper part of the vessel W these two pipes are connected by a cross-pipe P, with valves 59 and 60, between which there is connected a pipe P', leading to the perforated sprinkling ring-pipe Q. (Shown by dotted lines in Fig. 2.) The pipes J and K are extended up above this cross-pipe P for connection with hot and cold water supply-pipes, if desired, and in that case connection with the main pipe A will be closed at 36 42.

I prefer to provide on the main-line pipe A at the left of the branches $d$, $f$, E, and G a check-valve 9, opening only toward those branches from the steam and compressed air or gas supply side, while at the right of the branches $d$, $f$, E, and G, I prefer to provide a check-valve 17, opening only toward those branches from the water-supply side. On the main-line pipe I prefer to provide also a thermometer T'.

A characteristic feature of my apparatus, it will be seen, is that I provide a working center by means of the main pipe-line A, into which I may feed either steam (or compressed air or gas) or water, and from which main line I run such branches as will enable me to supply to the cooker such steam, compressed air, or gas, or water as the exigencies of the brewing process being carried out may demand.

For the purpose of illustration I will now describe how my apparatus may be employed. First, let us say, I supply water through the valve-inlet B to the main pipe-line A, which water is free to run into the pipe A as far as the check-valve 9. The valves 127, 128, and 221 being opened, the water flows through the ring-pipe D, the pipe E, and the ring-pipe F into the cooker, the valves in the branches from the ring-pipes F and D and the valves 155 and 165 of the branch E having been also opened. These valves 155 and 165 are opened at this time in order to insure a thorough cleansing of the lower end of the cooker, as in some cases material may have been left there from a previous operation. By means of the water-gage U, I can know the quantity of water thus supplied to the vessel. At the proper time I close the inlet at B, and then I open the valve to supply steam at a to the main pipe-line A, and thence through the pipes D, E, and F into the vessel. I run the material into the cooker through the inlet-pipe x, and I raise the temperature slightly.

In order to let the air out of the cooker, I may either open the valve 91 in the outlet-pipe or I may provide a roundabout escape for the air through the pipes G and M by opening the valve 29. I may now raise the temperature of the material to the boiling-point by the described direct admission of steam through D, E, and F. By means of these several pipes I can apply the steam to any portion or all portions of the material in the cooker—as for instance, by opening the valve 155 or 165, or both, I can apply the steam to the material at the very nose of the cone, whence it will work up through to the top.

If it is desired to go beyond the boiling-point, by cooking under pressure, I see that the valves 29 and 91 are closed. By regulating the steam-supply by the valve at a in line A the valve 127 leading to the ring-pipe D, valve 128 leading to the branch line E, valves 155 and 166 in the branches from E to the bottom of the vessel, and the valves 221 and 225 in branches ƒ F, I can secure whatever temperature I desire. The temperature may be diminished by closure of those valves and by opening more or less the valve 91 of the outlet-pipe M. If it is desired to reduce the temperature below the boiling-point of water, for example, I may admit cold water at B after closing the steam-supply, and upon opening the valve 25 this cold water will flow through the pipe G into the upper part of the vessel W. When the desired temperature is reached, the valve 25 may be closed, and the valve at B also.

When the process of cooking in the vessel is finished and it is desired to transfer the material from the cooker to any other vessel or apparatus, I close all the valves to the branch pipes leading from the main pipe-line A, with the exception of the valve 25 in the pipe G, which I open. I then turn either steam or compressed air or gas in the main pipe-line A, as may be preferred, and this pressure is admitted to the upper part of the vessel through the pipe G. When this is done, I open the valve 177 at the bottom of the vessel, whereupon the material will be forced out by the pressure through the outlet O to its destination.

When the whole of the material has been forced out of the cooker in this manner, the supply of steam, compressed air, or gas having been cut off, I open the water-inlet at B, and also valve 36 in the pipe J or valve 42 in the pipe K, or both, whereupon water is admitted through the sprinkling-ring Q into the cooker in order to clean it. By opening the valve 177 at the bottom of the cooker and the valve in the pipe R this wash-water may be run into the sewer. When the vessel has been cleaned, I open the valve at a to admit steam to the pipe-line A, and I also open the valve 128 in pipe E, but I keep the valves 155 and 166 of this branch pipe closed. I open the valve 174 in the branch H, so that steam will be forced into the outlet-pipe O to thoroughly clean it, or I may first close all the valves and open the water-inlet at B, the valve 128 in pipe E, and the valve 174 in branch H, so as to fill the outlet-pipe O with water. Then all the valves are closed again, and then I admit compressed air or gas at C and through the pipe E and branch H to force the water out of O, thus emptying and cleaning it.

I claim as my invention.

1. A cooking vessel for brewing purposes, provided with a main pipe-line A, a pipe-ring D below the pipe-line A, and another pipe F above the pipe-line A, branches from both rings into the vessels, valved branches from the pipe-line to the said rings, and valved steam and water connections to the main pipe-line.

2. A cooking vessel for brewing purposes, provided with a main-line steam-pipe and valved branches to the body of the vessel, a valved pipe N from the top of the vessel, a valved branch G from the main steam-pipe connecting with the top of the vessel, and a valved exhaust branch M from the pipe G to the pipe N beyond the valve in the latter.

In testimony whereof I have signed my name to this specification in the presence of two subscribing witnesses.

CARL RACH.

Witnesses:
FRANK A. BUTLER,
HUBERT HOWSON.